Jan. 12, 1971     E. V. HORANOFF     3,554,028
PITCH DAMPING BALANCE
Filed Oct. 3, 1968     4 Sheets-Sheet 3

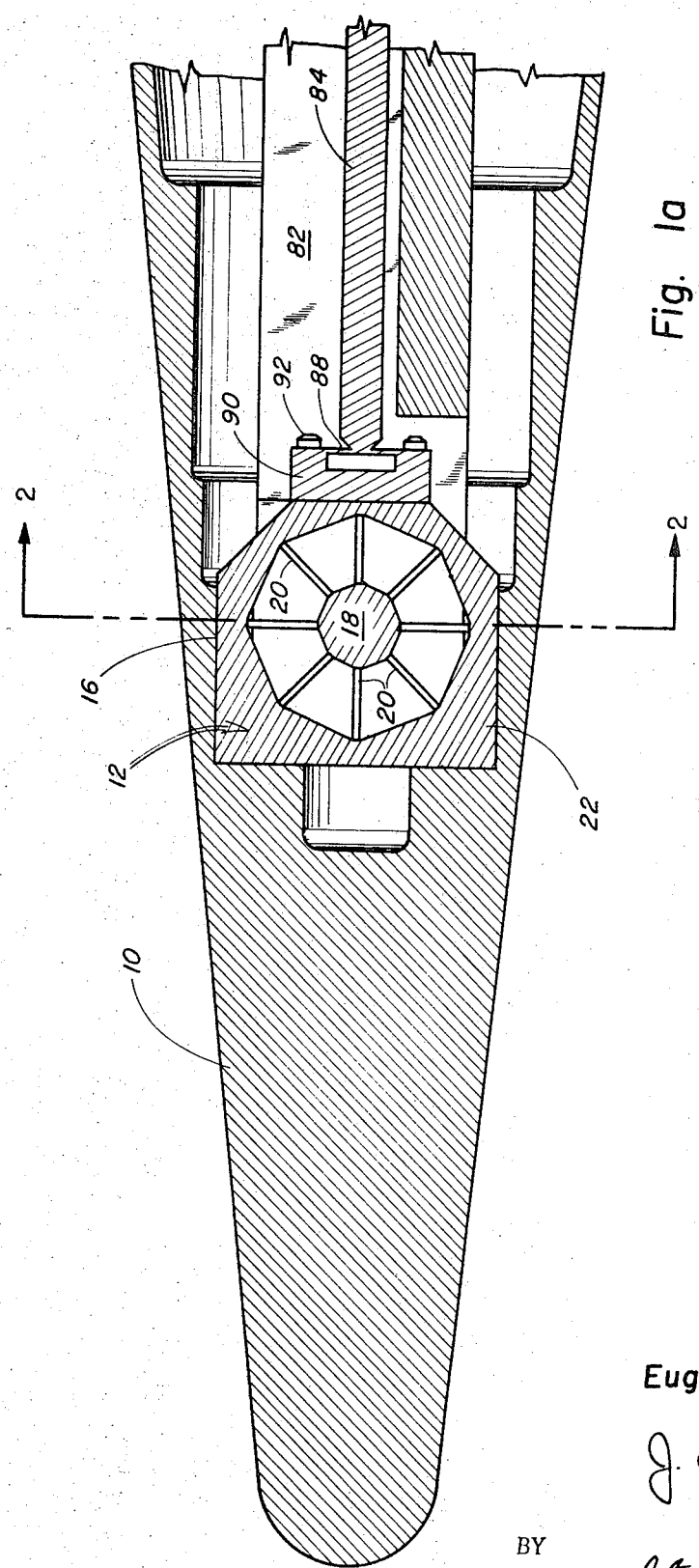

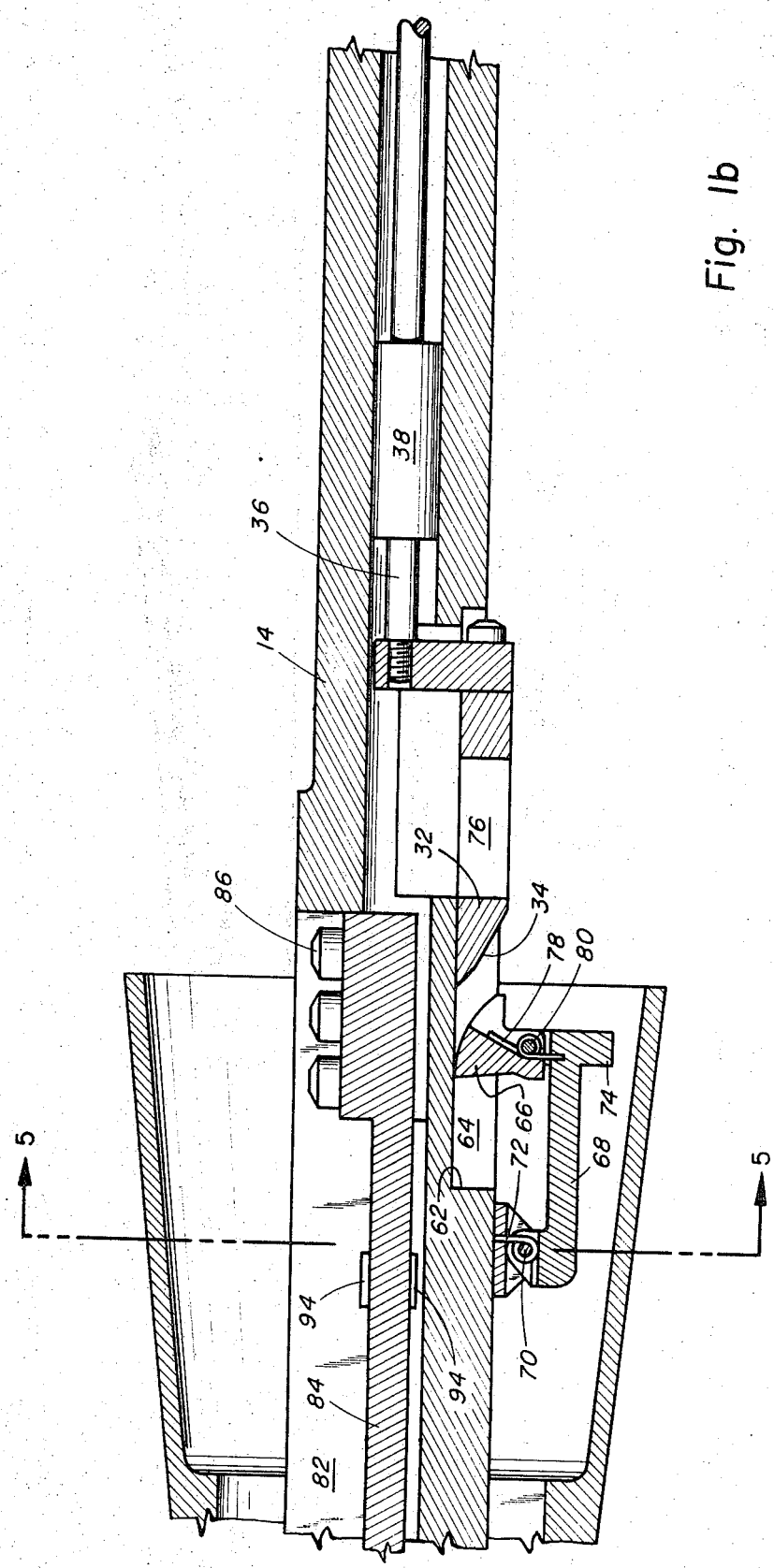

Jan. 12, 1971  E. V. HORANOFF  3,554,028
PITCH DAMPING BALANCE
Filed Oct. 3, 1968  4 Sheets-Sheet 4

United States Patent Office 3,554,028
Patented Jan. 12, 1971

---

3,554,028
PITCH DAMPING BALANCE
Eugene V. Horanoff, Clarksville, Md., assignor to the United States of America as represented by the Secretary of the Navy
Filed Oct. 3, 1968, Ser. No. 764,805
Int. Cl. G01m 9/00
U.S. Cl. 73—147                                24 Claims

ABSTRACT OF THE DISCLOSURE

A pitch damping wind tunnel balance having the model of aerodynamic shape mounted for oscillation in the pitch plane on a model support member secured to the forward end of the sting. A long thin beam has one end thereof secured to the sting and the other end thereof secured to the model support member such that oscillatory movement in the pitch plane is mechanically damped. A piston-cylinder sliding cam mechanism is utilized to induce oscillatory movement to the model.

BACKGROUND OF THE INVENTION

This invention relates generally to wind tunnel balances, and more particularly to a pitch damping wind tunnel balance.

There has been a long felt need in wind tunnel experimentation to provide a balance for a small model or aerodynamic shape such, for example, as a projectile, rocket or the like in which the model may oscillate about a discrete point at a small angle of attack in a high velocity stream of air while the model is disposed within a supersonic or hypersonic wind tunnel whereby the damping in the pitch balance and the rate of such damping may be mechanically induced.

In devices of this type heretofore devised it has been the usual practice to support the model by a cantilever strain gauge structure employing heavy coil springs for supplying a restoring moment at the angles of attack. Such devices have not proved altogether satisfactory in service for the reason that the point of rotation moved as a function of the spring spring force, the frequency of oscillation was fixed by the size of the spring required to obtain the restoring force, the strong spring employed caused a reaction in the sting supporting the model in the center of gravity, and movement of the model was limited by reason of the structure employed to support it.

Another device known to the prior art supports the model by a flexible unit of steel crossed flexures within the damping balance which effectively permits the model to oscillate about a point. The amplitude of such oscillations and the pitch of the model corresponding thereto are sensed by a plurality of strain gauges secured to the flexure members and the angular acceleration of the decay in the angular movement of the model is sensed by an accelerometer carried in the forward end of the movable portion of the sting and within the model. Since the restoring torques for damping the oscillating model are provided by the air stream passing over the model and the relatively thin flexures supporting the model, this system has been restricted to relatively small angles utilizing low restoring torques.

SUMMARY OF THE INVENTION

Accordingly, one object of this invention is to provide a new and improved pitch damping wind tunnel balance for an aerodynamic model in which a large restoring torque is provided to damp the oscillatory movement of the model.

Another object of the invention is the provision of a new and improved pitch damping wind tunnel balance for an aerodynamic model in which the model is set into oscillation, the oscillation having a relatively large angle of rotation and which balance utilizes a large restoring torque to damp the oscillatory movement.

Still another object of the present invention is the provision of a new and improved pitch damping wind tunnel balance for an aerodynamic model in which the model is set into oscillation by remote control while the tunnel is in operation.

A further object of the instant invention is to provide a new and improved pitch damping wind tunnel balance for an aerodynamic model in which the model is set into oscillation, the oscillation having a relatively large angle of rotation, the balance having a restoring moment provided to damp the oscillatory movement while moderating the damping effect of air flow across the model.

Briefly, in accordance with one embodiment of this invention, these and other objects are obtained by providing a wind tunnel balance having a sting with a longitudinal axis, a model support on one end of the sting capable of limited oscillatory movement about an axis perpendicular to the longitudinal axis of the sting wherein the axis of oscillation intersects the longitudinal axis, a mechanical damping device for affecting alignment of the model and support with the longitudinal axis of the sting, and a mechanism for affecting angular misalignment of the model and support with the longitudinal axis of the sting.

BRIEF DESCRIPTION OF THE DRAWING

A more complete appreciation of the invention and many of the attendant advantages thereof will be readily appreciated as the same becomes better understood by reference to the following detailed detailed description when considered in connection with the accompanying drawings wherein:

FIG. 6 is a block diagram showing the proper assemblage of sections 1a, 1b and 1c of FIG. 1.

DESCRIPTION OF THE PREFERRED EMBODIMENT

Figure 1C:
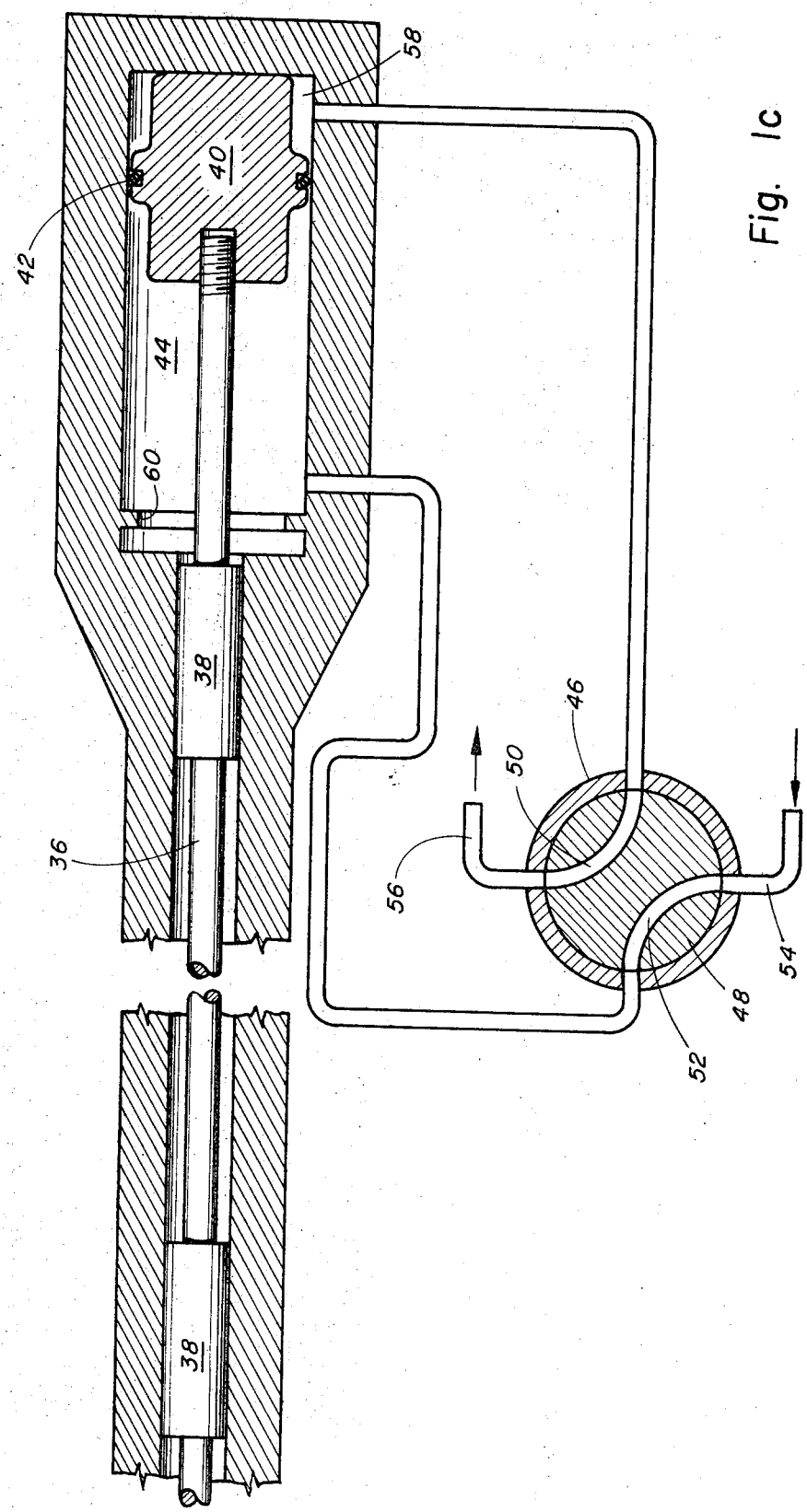
FIG. 1 is a longitudinal side view, in section and partially broken away, of the preferred embodiment of the invention.

Referring now to the drawings wherein like reference characters designate identical or corresponding parts throughout the several views, and more particularly to FIG. 1 thereof, a wind tunnel model 10 of aerodynamic configuration is illustrated as secured to a model support 12 on the forward portion of a balance sting 14. The interior of model 10 and the exterior of support 12 have complementary engaging surfaces as shown at 16 in FIGS.

1 and 2 such that the model 10 may be install on support member 12 with relative ease.

Figure 3:
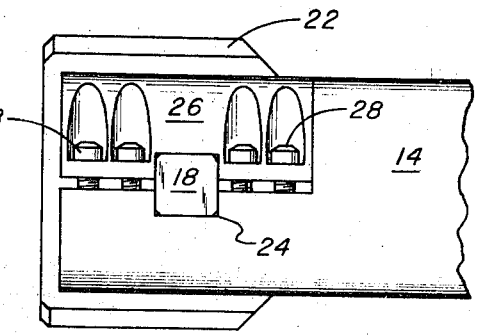
FIG. 3 is a fragmentary side view, of the forward portion of the sting with the model removed.
Figure 2:
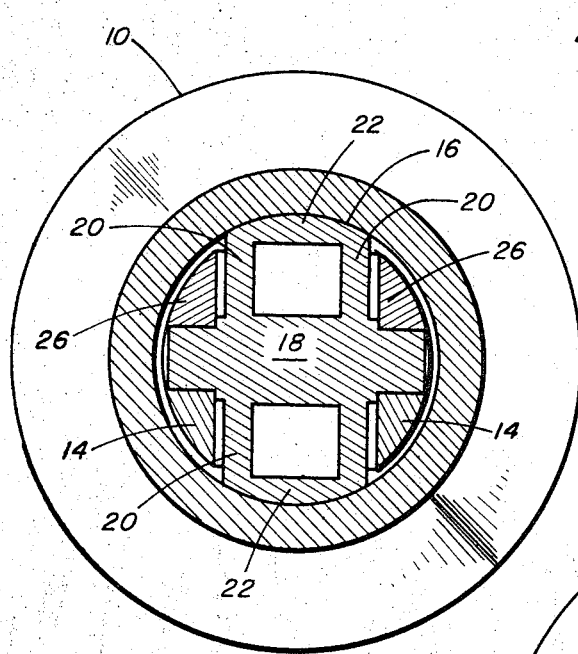
FIG. 2 is a sectional view taken along the line 2—2 of FIG. 1.

Referring now to FIGS. 1 and 2, it can be seen that support member 12 has a central shaft 18, a plurality of equally spaced radially extending flexible resilient members 20 and a model mount 22 circumscribing the shaft 18 and attached to the outer portions of the flexures 20. As more clearly shown in FIG. 3, the end portions of shaft 18 have a square cross section seated within a groove 24 of similar shape in sting 14, and is fixedly secured by clamp members 26 which are in turn secured to sting 14 by attaching means such as screws 28. With shaft 18 fixedly mounted such that rotational movement is prevented, model 10 and mount 22 are permitted to oscillate about shaft 18 due to the resilient flexible nature of flexures 20.

Figure 4:
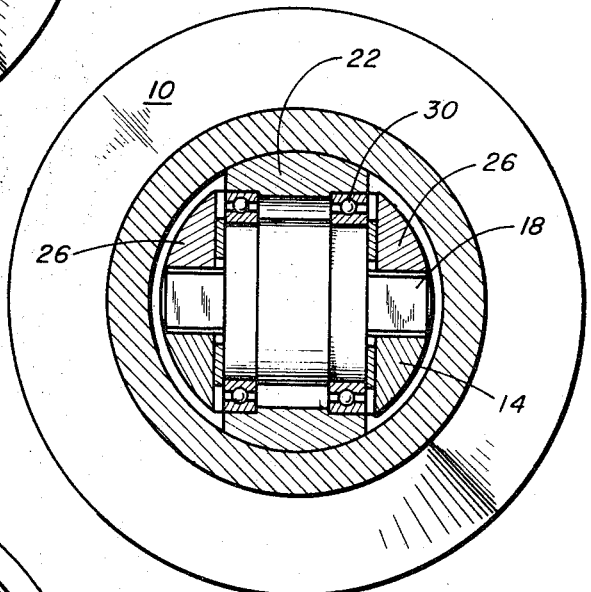
FIG. 4 is a sectional view taken along the line 2—2 of FIG. 1 showing a second embodiment of the present invention.

A second embodiment of support 12 is illustrated in FIG. 4 wherein there is shown a ball-bearing race 30 supporting mount 22 on shaft 18 such that mount 22 is capable of limited rotational or oscillatory movement about shaft 18. It is necessary to induce oscillatory movement to support 22 and model 10 so that the damping effect of the pitch plane may be observed.

By affecting angular misalignment of the model supporting means with the longitudinal axis of the sting and subsequently releasing the supporting means from the misaligned position, oscillatory movement of the model and the supporting means about shaft 18 is induced. As illustrated in FIG. 1, a sliding cam 32 provided with an inclined forward surface 34 is fixedly mounted on the forward end of a rod 36 which is slidingly mounted in bushings 38 for sliding movement along the longitudinal axis of sting 14. A piston 40 having a circumscribing O-ring seal 42 is secured to the aft end of rod 36 for sliding movement within a cylinder 44 formed within sting 14. A standard valve 46 for reversing piston direction is illustrated as having a rotary portion 48 with internal conduits 50 and 52. Pressure is introduced into the valve through a conduit 54, and pressure is relieved from the valve by a conduit 56. By rotating portion 48 of valve 46 ninety degrees, the direction of movement of piston 40 is reversed. The cam 32 and piston 40 are shown in the retracted or inactive position. By rotating portion 48 of valve 46 ninety degrees, pressure will be introduced into section 58 of cylinder 44 to move piston 40 into engagement with a circumferential flange 60. Since the movement of sliding cam 32 is directly controlled by the movement of piston 40, as piston 40 moves toward engagement with flange 60 cam 32 moves toward engagement with a wall 62 formed at the forward end of a cut out segment 64 in the lower portion of sting 14. Inclined surface 34 thus engages a cam follower 66 which is mounted on the aft end of an arm member 68 as the cam member 32 moves toward engagement with wall 62. Arm member 68 is pivotally mounted on a pin 70 and is biased in a counter-clockwise direction toward the sting 14 by means such as spring 72. As the inclined surface 34 of cam 32 engages cam follower 66, the arm member 68 will be rotated in a clockwise direction against spring 72 such that an anvil 74 on the aft end of arm 68 will be moved into engagement with model 10. When in the fully extended position, anvil 74 will have rotated model 10 about shaft 18 through a small angle such as 1.5 degrees. As inclined surface 34 continues in a forward direction to engage surface 62, cam follower 66 will be disengaged by the inclined surface and will be urged into an opening 76 in cam member 32 by biasing means 72 such that the anvil 74 will disengage model 10 thus inducing an oscillatory movement thereto. Cam follower 68 is biased into the position shown in the drawings by a spring 78 such that upon withdrawal of cam 32 by reversing valve 46 the cam follower 66 is rotated in a clock-wise direction about a pin 80 fixedly mounted on the aft end of arm 68 making withdrawal of the cam 32 possible without causing engagement of anvil 74 with model 10.

Figure 5:
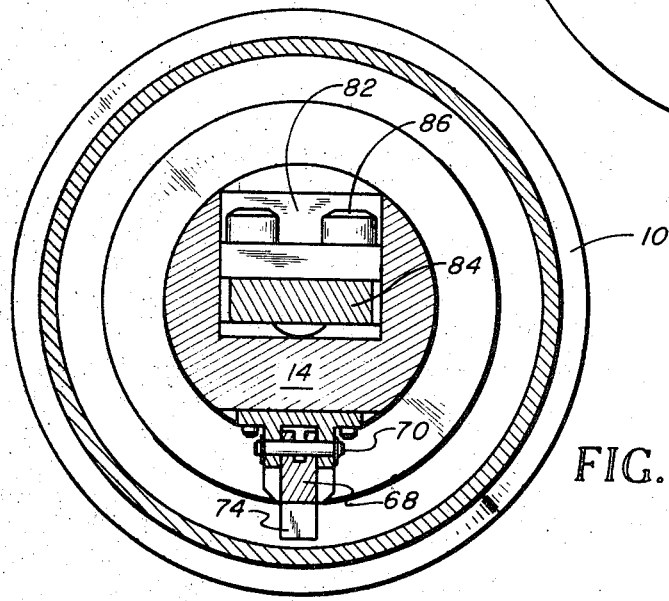
FIG. 5 is a sectional view taken along the line 5—5 of FIG. 1.

To get relatively large angles of oscillation (one and one-half degrees) combined with a high restoring moment, a mechanical damping device is provided on the balance as illustrated in FIGS. 1 and 5. The forward portion of balance 14 has a channel 82 formed in the upper surface thereof to permit an elongated heavy beam 84 to be mounted along the longitudinal axis of sting 14 by means such as machine screws 86. The forward end of beam 84 has a flexure 88 formed integrally therewith which is in turn integrally formed on a mounting block 90 securely mounted to mount 22 by means such as machine screws 92. Beam 84 mechanically damps the oscillatory pitching movement of the model 10 and mount 22. Flexure 88 is provided to permit slight longitudinal movement while mount 22 is in oscillation. Strain gages 94 are secured to opposite faces of beam 84 to detect the amount of oscillation of model 10 and the damping effects of beam 84.

In operation, to obtain accurate data, the damping effects of beam 84 without air flow across the model would be recorded, and subsequently the damping effects of beam 84 with air flow across the model would be recorded. The mathematically calculated difference between the two sets of readings would provide the damping effects of air flow passing over the model.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A wind tunnel balance comprising:
   a sting having a longitudinal axis,
   means for supporting a model on one end of said sting capable of limited oscillatory movement about an axis perpendicular to said longitudinal axis of said sting wherein said axis of oscillation intersects said longitudinal axis, and
   means for yieldingly affecting alignment of said model with said longitudinal axis of said sting and including motion damping means coupled to said model supporting means and to said sting for resiliently biasing said model into a position aligned with said longitudinal axis of said sting.

2. The wind tunnel balance as defined in claim 1 further comprising
   means for affecting angular misalignment of said model with said longitudinal axis of said sting.

3. The wind tunnel balance as defined in claim 2 wherein said means for affecting angular misalignment comprises
   an arm member having one end thereof pivotally mounted to said sting and the other end thereof free to engage a model supported on said sting,
   means for biasing said arm member toward said sting,
   a cam follower mounted on said arm member at the free end thereof, and
   a sliding cam member mounted on said sting for longitudinal movement from a first position wherein said cam and follower are disengaged to a second position wherein said cam engages said followed to pivot said arm member away from said sting to a third position wherein said cam disengages said follower such that said biasing means returns said arm member toward said sting.

4. The wind tunnel balance as defined in claim 3 further comprising
   piston and cylinder means for affecting longitudinal sliding movement of said cam.

5. The wind tunnel balance as defined in claim 1 wherein said model supporting means comprises
   a shaft having end portions rigidly affixed to said sting at the forward end thereof,
   a plurality of flexible resilient members radially extending from said shaft, and
   a model mount circumscribing said shaft and attached to the outer portions of said flexible resilient members.

6. The wind tunnel balance as defined in claim 5 further comprising
means for affecting angular misalignment of said model with said longitudinal axis of said sting.

7. The wind tunnel balance as defined in claim 6 wherein said means for affecting angular misalignment comprises
an arm member having one end thereof pivotally mounted to said sting and the other end thereof free to engage a model supported on said sting,
means for biasing said arm member towards said sting,
a cam follower mounted on said arm member at the free end thereof, and
a sliding cam member mounted on said sting for longitudinal movement from a first position wherein said cam and said follower are disengaged to a second position wherein said cam engages said follower to pivot said arm member away from said sting to a third position wherein said cam disengages said follower such that said biasing means returns said arm member towards said sting.

8. The wind tunnel balance as defined in claim 7 further comprising
piston and cylinder means for affecting longitudinal sliding movement of said cam.

9. The wind tunnel balance of claim 1 wherein said model supporting means comprises
a shaft having end portions rigidly affixed to said sting at the forward end thereof,
a model mount circumscribing said shaft and spaced therefrom, and
bearing means for rotationally supporting said mount on said shaft.

10. The wind tunnel balance as defined in claim 9 further comprising
means for affecting angular misalignment of said model with said longitudinal axis of said sting.

11. The wind tunnel balance as defined in claim 10 wherein said means for affecting angular misalignment comprises
an arm member having one end thereof pivotally mounted to said sting and the other end thereof free to engage a model supported on said sting,
means for biasing said arm member towards said sting,
a cam follower mounted on said arm member at the free end thereof, and
a sliding cam member mounted on said sting for longitudinal movement from a first position wherein said cam and follower are disengaged to a second position wherein said cam engages said follower to pivot said arm member away from said sting to a third position wherein said cam disengages said follower such that said biasing means returns said arm member towards said sting.

12. The wind tunnel balance as defined in claim 11 further comprising
piston and cylinder means for affecting longitudinal sliding movement of said cam.

13. The wind tunnel balance as defined in claim 1 wherein said motion damping means comprises
an elongated flexible beam having a longitudinal axis coextensive with said longitudinal axis of said sting and having one end thereof rigidly secured to said sting with the other end thereof secured to said model supporting means.

14. The wind tunnel balance as defined in claim 13 further comprising
means for affecting angular misalignment of said model with said longitudinal axis of said sting.

15. The wind tunnel balance as defined in claim 14 wherein said means for affecting angular misalignment comprises
an arm member having one end thereof pivotally mounted to said sting and the other end thereof free to engage a model supported on said sting,
means for biasing said arm member toward said sting,
a cam follower mounted on said arm member at the free end thereof, and
a sliding cam member mounted on said sting for longitudinal movement from a first position wherein said cam and follower are disengaged to a second position wherein said cam engages said follower to pivot said arm member away from said sting to a third position wherein said cam disengages said follower such that said biasing means returns said arm member towards said sting.

16. The wind tunnel balance as defined in claim 15 further comprising
piston and cylinder means for affecting longitudinal sliding movement of said cam.

17. The wind tunnel balance as defined in claim 13 wherein said model supporting means comprises
a shaft having end portions rigidly affixed to said sting at the forward end thereof,
a plurality of flexible resilient members radially extending from said shaft, and
a model mount circumscribing said shaft and attached to the outer portions of said flexible resilient members.

18. The wind tunnel balance as defined in claim 17 further comprising
means for affecting angular misalignment of said model with said longitudinal axis of said sting.

19. The wind tunnel balance as defined in claim 18 wherein said means for affecting angular misalignment comprises
an arm member having one end thereof pivotally mounted to said sting and the other end thereof free to engage a model supported on said sting,
means for biasing said arm member toward said sting,
a cam follower mounted on said arm member at the free end thereof, and
a sliding cam member mounted on said sting for longitudinal movement from a first position wherein said cam and follower are disengaged to a second position wherein said cam engages said follower to pivot said arm member away from said sting to a third position wherein said cam disengages said follower such that said biasing means returns said arm member towards said sting.

20. The wind tunnel balance as defined in claim 19 further comprising
piston and cylinder means for affecting longitudinal sliding movement of said cam.

21. The wind tunnel balance as defined in claim 13 wherein said model supporting means comprises
a shaft having end portions rigidly affixed to said sting at the forward end thereof,
a model mount circumscribing said shaft and spaced therefrom, and
bearing means for rotationally supporting said mount on said shaft.

22. The wind tunnel balance as defined in claim 21 further comprising
means for affecting angular misalignment of said model with said longitudinal axis of said sting.

23. The wind tunnel balance as defined in claim 22 wherein said means for affecting angular misalignment comprises
an arm member having one end thereof pivotally mounted to said sting and the other end thereof free to engage a model supported on said sting,
means for biasing said arm member towards said sting,
a cam follower mounted on said arm member at the free end thereof, and
a sliding cam member mounted on said sting for longitudinal movement from a first position wherein said cam and follower are disengaged to a second position wherein said cam engages said follower to pivot said arm member away from said sting to a third position wherein said cam disengages said follower such that said biasing means returns said arm member towards said sting.

24. The wind tunnel balance as defined in claim 23 further comprising
piston and cylinder means for affecting longitudinal sliding movement of said cam.

References Cited

UNITED STATES PATENTS 2,906,119  9/1959  Montgomery _____ 73—147
3,386,780  6/1968  Durgin _____ 73—147

S. CLEMENT SWISHER, Primary Examiner